US011238370B2

(12) United States Patent
Jain et al.

(10) Patent No.: US 11,238,370 B2
(45) Date of Patent: Feb. 1, 2022

(54) APPROACHES FOR DETERMINING SENSOR CALIBRATION

(71) Applicant: Woven Planet North America, Inc., Los Altos, CA (US)

(72) Inventors: Ashesh Jain, Palo Alto, CA (US); Lei Zhang, Sunnyvale, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 109 days.

(21) Appl. No.: 16/237,321

(22) Filed: Dec. 31, 2018

(65) Prior Publication Data

US 2020/0210887 A1 Jul. 2, 2020

(51) Int. Cl.
*G06N 20/00* (2019.01)
*G01S 7/497* (2006.01)
*G01S 7/40* (2006.01)
*B60R 11/04* (2006.01)

(52) U.S. Cl.
CPC .............. *G06N 20/00* (2019.01); *B60R 11/04* (2013.01); *G01S 7/40* (2013.01); *G01S 7/4972* (2013.01)

(58) Field of Classification Search
CPC .................................. G01S 7/4972; G01S 7/40
See application file for complete search history.

(56) References Cited

U.S. PATENT DOCUMENTS

| 10,832,093 | B1 * | 11/2020 | Taralova | G06K 9/6212 |
|---|---|---|---|---|
| 2017/0103588 | A1 * | 4/2017 | Rajani | G07C 5/0808 |
| 2017/0169627 | A1 * | 6/2017 | Kim | G05D 1/0257 |
| 2020/0111011 | A1 * | 4/2020 | Viswanathan | H04N 17/002 |

* cited by examiner

*Primary Examiner* — Imran K Mustafa
(74) *Attorney, Agent, or Firm* — Christopher G. Darrow; Darrow Mustafa PC

(57) ABSTRACT

Systems, methods, and non-transitory computer-readable media can determine first sensor data captured by a first sensor of a vehicle. Second sensor data captured by a second sensor of the vehicle can be determined. Information describing the first sensor data and the second sensor data can be provided to a machine learning model trained to predict whether a pair of sensors are calibrated or mis-calibrated based on sensor data captured by the pair of sensors. A determination is made whether the first sensor and the second sensor are calibrated or mis-calibrated based on an output from the machine learning model.

20 Claims, 9 Drawing Sheets

APPROACHES FOR DETERMINING SENSOR CALIBRATION

FIELD OF THE INVENTION

The present technology relates to the field of vehicles. More particularly, the present technology relates to systems, apparatus, and methods for determining sensor calibration.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have optical cameras that can recognize hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to determine first sensor data captured by a first sensor of a vehicle. Second sensor data captured by a second sensor of the vehicle can be determined. Information describing the first sensor data and the second sensor data can be provided to a machine learning model trained to predict whether a pair of sensors are calibrated or mis-calibrated based on sensor data captured by the pair of sensors. A determination is made whether the first sensor and the second sensor are calibrated or mis-calibrated based on an output from the machine learning model.

In an embodiment, the first sensor and the second sensor each correspond to an optical camera, a Light Detection And Ranging (LiDAR) sensor, a radar sensor, an infrared camera, INS, or an ultrasound sensor.

In an embodiment, the first sensor data captured by the first sensor and the second sensor data captured by the second sensor are synchronized based on time.

In an embodiment, the first sensor is a same type of sensor as the second sensor.

In an embodiment, the first sensor is a different type of sensor than the second sensor.

In an embodiment, the systems, methods, and non-transitory computer readable media are configured to train the machine learning model based on a set of training examples, wherein the training examples are generated from sensor data captured by sensors of a fleet of vehicles, wherein the training examples include positive training examples of calibrated sensor data captured by a pair of calibrated sensors and negative training examples of mis-calibrated sensor data.

In an embodiment, the negative training examples are synthetically generated from the positive training examples based at least in part on a translation or rotation offset applied to one or more of the positive training examples.

In an embodiment, the systems, methods, and non-transitory computer readable media are configured to determine that the first sensor and the second sensor are mis-calibrated based on the output from the machine learning model and determine an amount of mis-calibration between the first sensor and the second sensor.

In an embodiment, the systems, methods, and non-transitory computer readable media are configured to determine that the first sensor and the second sensor are mis-calibrated based on the output from the machine learning model and generate one or more alerts in response to the determination that the first sensor and the second sensor are mis-calibrated.

In an embodiment, the systems, methods, and non-transitory computer readable media are configured to determine that the first sensor and the second sensor are mis-calibrated based on the output from the machine learning model and apply one or more operations to correct the mis-calibration based at least in part on an amount of mis-calibration offset outputted by the machine learning model.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

Figure 1A:
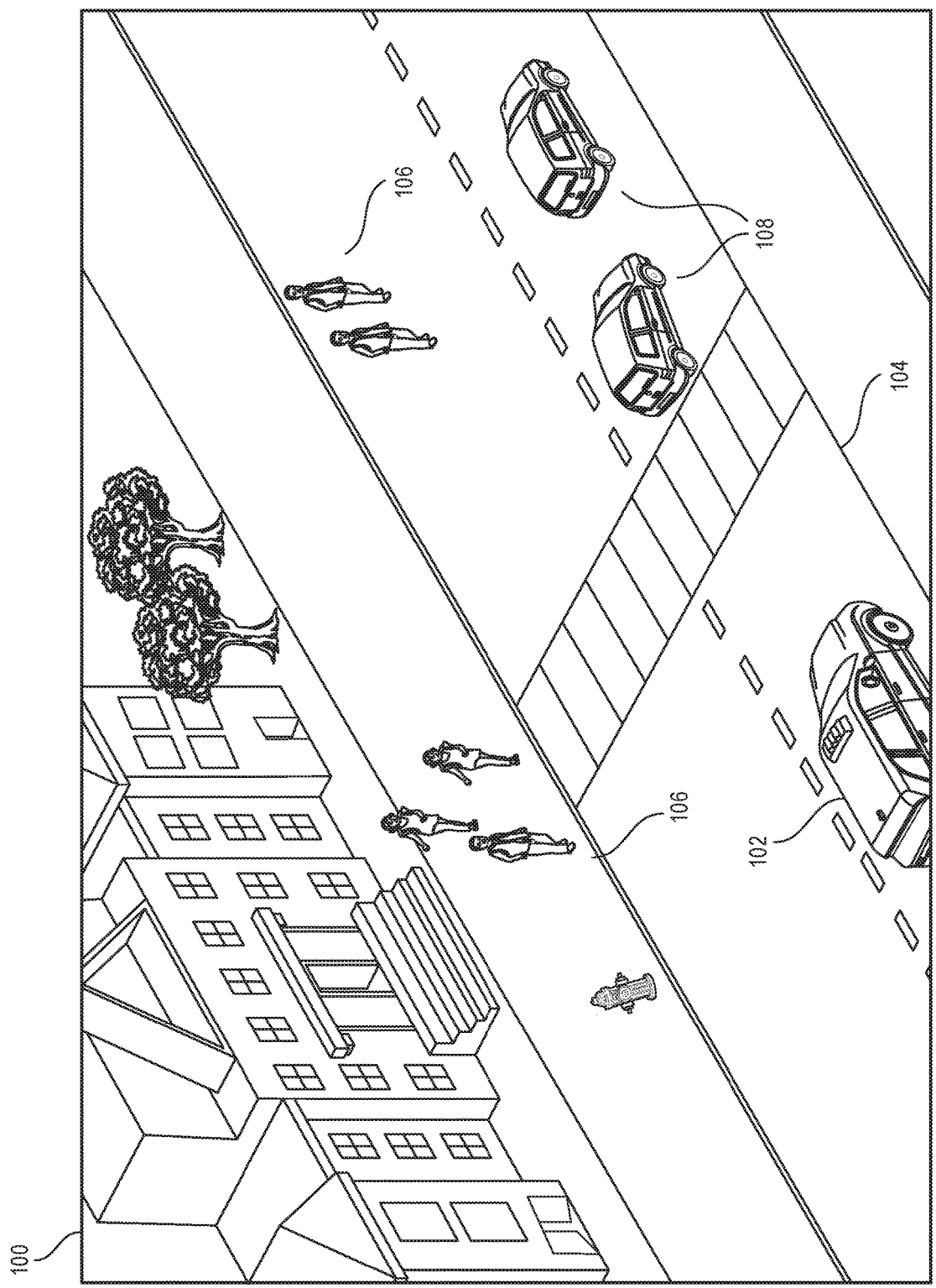
FIGS. 1A-1B illustrate various challenges that may be experienced by a vehicle, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. A vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, a vehicle may have optical cameras that can recognize hazards, roads, lane markings, traffic signals, and the like. In another example, a vehicle may have Light Detection And Ranging (LiDAR) sensors for generating three-dimensional representations of an environment and objects within the environment. Data from sensors may be used to, for example, safely drive the vehicle, activate certain safety features (e.g., automatic braking), and generate alerts about potential hazards. In general, sensors of a vehicle need to be calibrated (or aligned) regularly so they can accurately perceive environments and objects within the environments. Conventional approaches for calibrating sensors of a vehicle include factory offline calibration techniques including humans manually positioning a chessboard in scenes to be captured, capturing sensor data of the scenes using a pair of sensors, and applying edge detection to the captured sensor data to determine whether the sensors are aligned. This conventional calibration procedure is typically repeated for each pair of sensors being calibrated. Conventional online calibration techniques are also undesirable. For example, conventional online calibration techniques typically require human assistance to understand scenes represented in captured sensor data. For example, such conventional approaches can require human assistance to detect edges and corners represented in the scenes. Thus, conventional approaches are undesirable due to the time consuming nature of such calibration techniques and the amount of human effort that is needed to calibrate sensors of a vehicle. Further, conventional approaches are also less capable because they typically require a vehicle to be stationary during the calibration procedure.

Figure 1B:
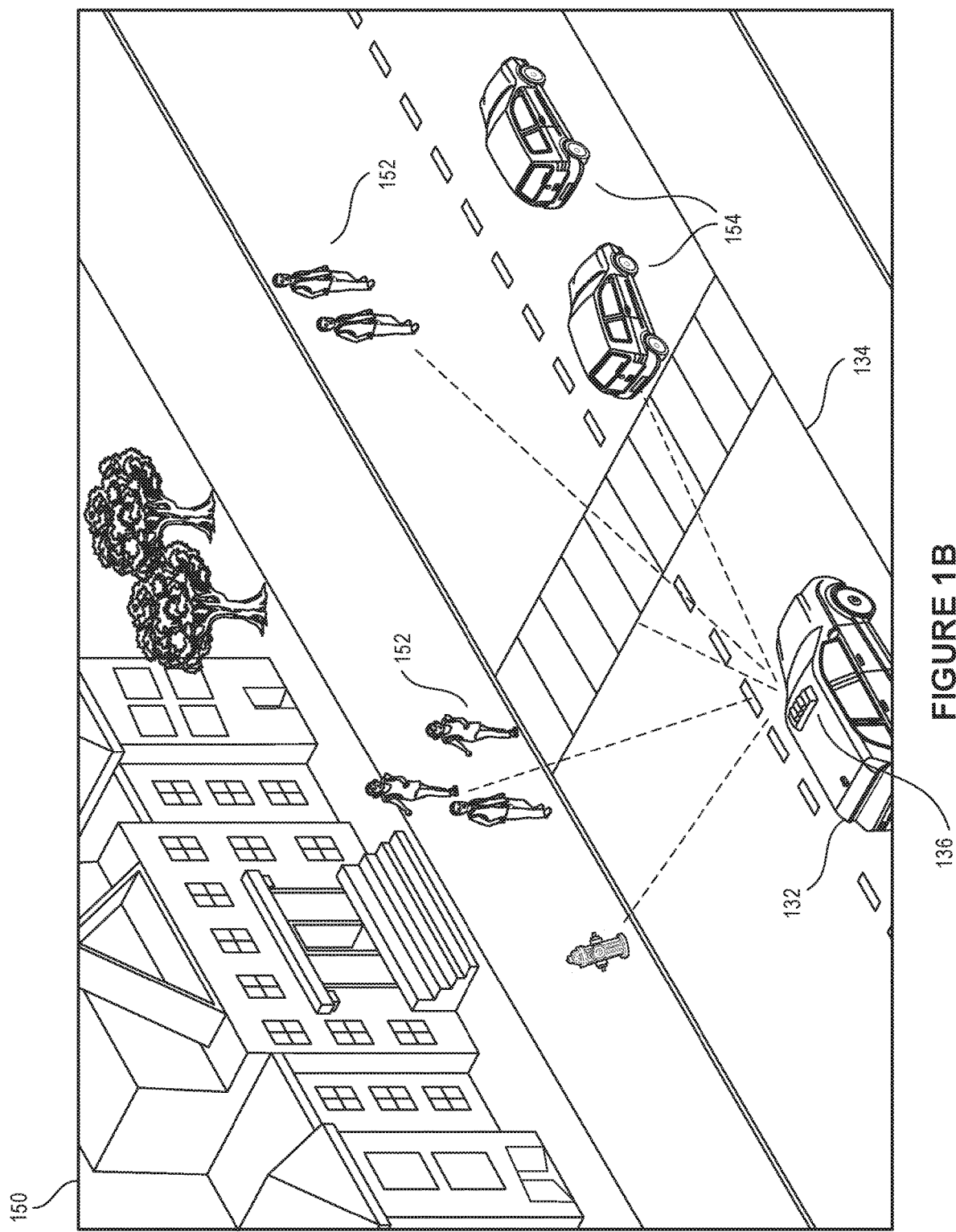
Figure 6:
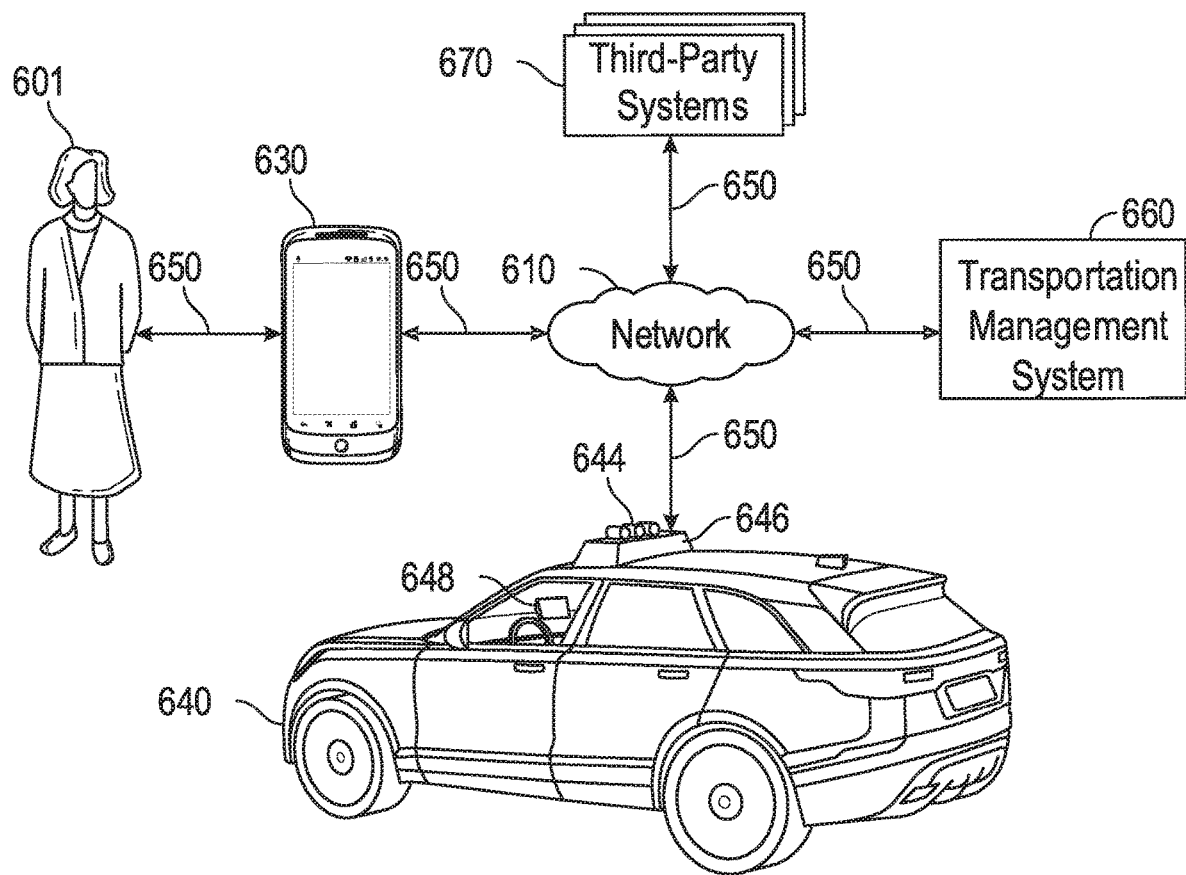
FIG. 6 illustrates an example block diagram of a transportation management environment, according to an embodiment of the present technology.

FIG. 1A illustrates various challenges that may be experienced by a vehicle, for example, when navigating an environment. For example, FIG. 1A illustrates one example environment 100 in which a vehicle 102 is shown navigating a road 104. While navigating, the vehicle 102 needs to be aware of its precise location within the environment 100 and corresponding locations of other objects present in the environment 100. For example, as shown in FIG. 1A, the vehicle 102 needs to be aware of pedestrians 106, vehicles 108, and other objects that are present. In general, a vehicle may be equipped with one or more sensors that can be used to capture environmental information, such as information describing a given road and objects present on or along the road. For example, in some instances, a vehicle may be equipped with one or more sensors in a sensor suite including optical cameras, LiDAR, radar, infrared cameras, and ultrasound equipment, to name some examples. Such sensors can be used to collect information that can be used by the vehicle to understand its environment and objects within the environment. For example, FIG. 1B illustrates an example environment 150 in which a vehicle 132 is navigating a road 134. The vehicle 132 can be, for example, a vehicle 640 as shown in FIG. 6. In FIG. 1B, the vehicle 132 includes a sensor suite 136 that can be used to sense static (or stationary) objects, dynamic objects (e.g., objects in motion), and semi-permanent (or ephemeral) objects that are around (or within some threshold proximity of) the vehicle 132. In this example, information collected by sensors included in the sensor suite 136 can be used to localize the vehicle 132 within the environment 150. The information can also be used to determine the presence of objects in the environment 150 such as pedestrians 152, other vehicles 154, and other objects (e.g., fire hydrant, crosswalk, etc.). In some instances, sensors in the sensor suite 136 may become mis-aligned. For example, the sensors may become mis-aligned due to thermal expansion or physical damage experienced by the vehicle 132. As a result, the sensors need to be calibrated regularly to ensure fidelity of captured sensor data. For example, a mis-alignment between an optical camera and a LiDAR sensor in the sensor suite 136 may result in the vehicle 132 being unable to determine a location of the pedestrians 152 with sufficient accuracy.

An improved approach in accordance with the present technology overcomes the foregoing and other disadvantages associated with conventional approaches. The improved approach can allow vehicles to determine calibration or mis-calibration of sensors in real-time (or near real-time). For example, in various embodiments, a machine learning model (e.g., a neural network) for predicting calibration or mis-calibration of sensors can be trained. The machine learning model can be trained using training data that includes positive examples of calibrated sensor data and negative examples of mis-calibrated sensor data. Once trained, the trained machine learning model can process sensor data captured by a set of sensors and can predict whether the set of sensors are calibrated or mis-calibrated. In various embodiments, an amount of mis-calibration between the set of sensors can also be determined, for example, based on a regression analysis of the sensor data captured by the set of sensors. For example, sensor data captured by a plurality of sensors of a vehicle can be provided as input to the trained machine learning model. As an example, the trained machine learning model can be provided sensor data captured by a pair of sensors of a vehicle. The trained machine learning model can process the sensor data to predict whether the pair of sensors are calibrated or mis-calibrated. In general, the trained machine learning model can predict calibration or mis-calibration for a plurality of sensors of a vehicle including, for example, a pair of optical cameras, a pair of LiDAR sensors, a pair of radar sensors, an optical camera and a LiDAR sensor, an optical camera and a radar sensor, a LiDAR sensor and a radar sensor, an IMU (or INS) sensor and a LiDAR sensor, and an RGBD-camera and a LiDAR sensor, to name some examples. In the example of FIG. 1B, the trained machine learning model can be implemented by the vehicle 132 to determine (or predict) whether sensors of the vehicle 132 are calibrated or mis-calibrated. For example, sensor data captured by sensors of the vehicle 132 can be provided to the machine learning model. The machine learning model can evaluate the sensor data in real-time (or near real-time) and can output information indicating whether the sensors are calibrated or mis-calibrated. More details relating to the present technology are provided below.

Figure 2:
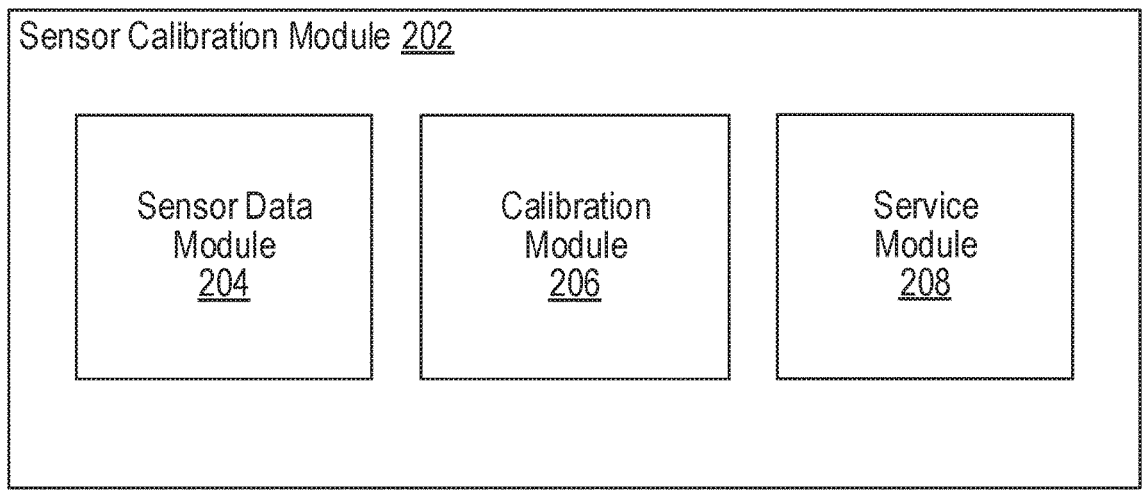
FIG. 2 illustrates an example sensor calibration module, according to an embodiment of the present technology.
Figure 2:
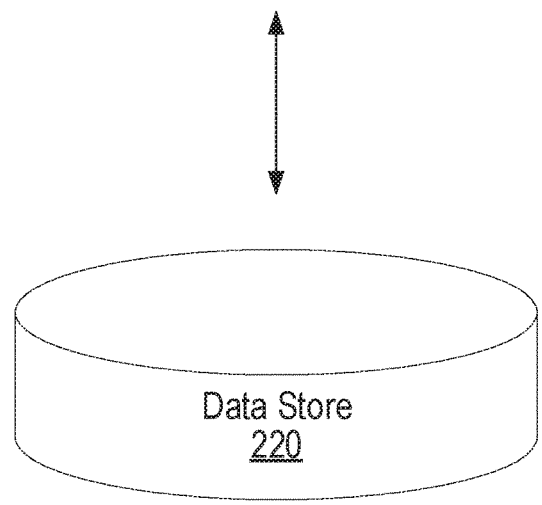

FIG. 2 illustrates an example system 200 including an example sensor calibration module 202, according to an embodiment of the present technology. As shown in the example of FIG. 2, the sensor calibration module 202 can include a sensor data module 204, a calibration module 206, and a service module 208. In some instances, the example system 200 can include at least one data store 220. The sensor calibration module 202 can be configured to communicate and operate with the at least one data store 220. The at least one data store 220 can be configured to store and maintain various types of data. For example, the data store 220 can store sensor data captured using various calibrated sensors and mis-calibrated sensors of a fleet of vehicles. In some embodiments, some or all of the functionality performed by the sensor calibration module 202 and its sub-modules may be performed by one or more backend computing systems, such as a transportation management system 660 of FIG. 6. In some embodiments, some or all of the functionality performed by the sensor calibration module 202 and its sub-modules may be performed by one or more computing systems implemented in a vehicle, such as a vehicle 640 of FIG. 6. In some embodiments, some or all data stored in the data store 220 can be stored by the transportation management system 660 of FIG. 6. In some embodiments, some or all data stored in the data store 220 can be stored by the vehicle 640 of FIG. 6. The components (e.g., modules, elements, etc.) shown in this figure and all figures herein are exemplary only, and other implementations may include additional, fewer, integrated, or different components. Some components may not be shown so as not to obscure relevant details.

The sensor data module 204 can be configured to access sensor data captured by vehicles. For example, the sensor data may include data captured by one or more sensors including optical cameras, LiDAR, radar, infrared cameras, ultrasound equipment, inertial measurement units (IMU), inertial navigation systems (INS), and RGBD-cameras, to name some examples. The sensor data module 204 can obtain such sensor data, for example, from the data store 220 or directly from sensors associated with a vehicle in real-time (or near real-time). In some instances, the obtained sensor data may have been collected by a fleet of vehicles that offer ridesharing services. In some embodiments, the sensor data module 204 can determine contextual information for sensor data such as a respective calendar date, day of week, and time of day during which the sensor data was captured. Such contextual information may be obtained from an internal clock of a sensor or a computing device, one or more external computing systems (e.g., Network Time Protocol (NTP) servers), or GPS data, to name some examples. More details describing the types of sensor data that may be obtained by the sensor data module 204 are provided below in connection with an array of sensors 644 of FIG. 6.

The calibration module 206 can be configured to determine calibration or mis-calibration of sensors of a vehicle based on sensor data captured by the sensors. In various embodiments, the calibration module 206 can implement a machine learning model that is trained to predict whether sensors of a vehicle are calibrated or mis-calibrated. In general, the machine learning model can be applied to determine calibration or mis-calibration for any type of sensor including optical cameras, LiDAR sensors, radar sensors, infrared sensors, and ultrasound sensors, to name some examples. In some embodiments, the calibration module 206 can also determine an amount of mis-calibration for sensors of the vehicle. More details regarding the calibration module 206 will be provided below with reference to FIG. 3.

The service module 208 can be configured to perform various operations when sensors of a vehicle are determined to be mis-calibrated. For example, in some embodiments, the service module 208 can generate one or more alerts (or notifications) in response to a determination that sensors of a vehicle are mis-calibrated. For example, the generated alerts can identify which sensors of the vehicle were determined to be mis-calibrated. The generated alerts can also specify an amount of mis-calibration for the sensors. For example, an alert can indicate that an optical camera and a LiDAR sensor of a vehicle were determined to be mis-calibrated. The alert can also provide an amount of mis-calibration between the optical camera and LiDAR sensor. In some embodiments, the service module 208 can perform operations to correct mis-calibrated sensors. For example, the service module 208 can cause the mis-calibrated sensors to be automatically adjusted, for example, based on an amount of mis-calibration determined for the sensors by the calibration module 206. For example, the service module 208 can automatically adjust calibration parameters between the mis-calibrated sensors.

Figure 3:
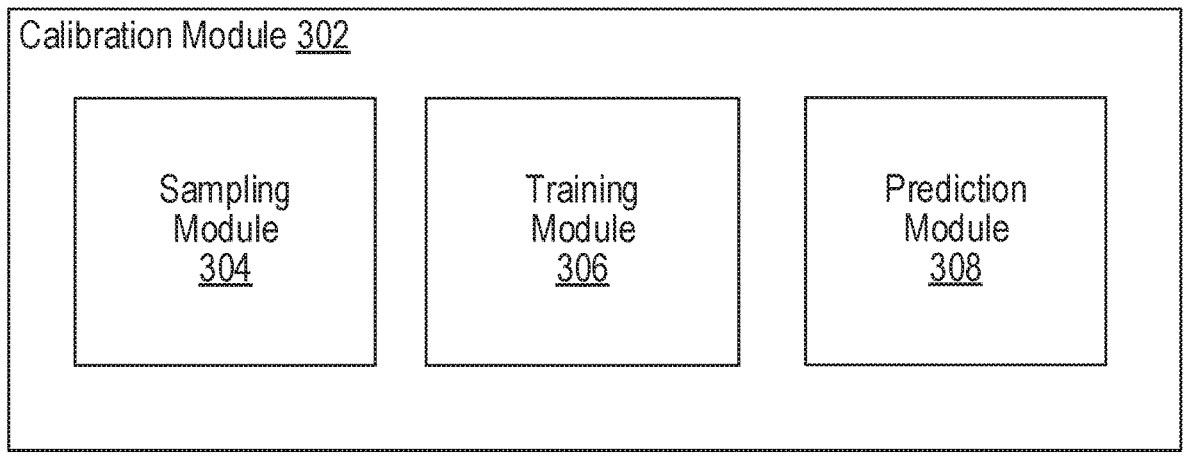
FIG. 3 illustrates an example calibration module, according to an embodiment of the present technology.

FIG. 3 illustrates an example calibration module 302, according to an embodiment of the present technology. In some embodiments, the calibration module 206 of FIG. 2 can be implemented with the calibration module 302. The calibration module 302 can be configured to train and implement a machine learning model for determining whether sensors of a vehicle are calibrated or mis-calibrated. As shown in the example of FIG. 3, the calibration module 302 can include a sampling module 304, a training module 306, and a prediction module 308.

The sampling module 304 can be configured to generate samples from sensor data collected by vehicles. The samples can be used to generate training data for training the machine learning model. In various embodiments, the sampling module 304 can generate the samples from sensor data collected by a fleet of vehicles. In such embodiments, sensors of vehicles that are used to collect sensor data are calibrated in advance to ensure fidelity of the sampled sensor data. In some embodiments, samples generated from sensor data captured by different sensors of a vehicle are synchronized based on time. The sampling module 304 can generate samples using various approaches. For example, in some embodiments, the sampling module 304 can generate samples based on a pre-defined travel distance or distance intervals. For example, sensor data captured by sensors of a vehicle can be sampled every 100 meters traveled by the vehicle. In this example, when the vehicle has traveled 100 meters, the sampling module 304 can sample sensor data collected by all of the sensors associated with the vehicle. For example, the sampling module 304 can sample image data captured by optical cameras, image data captured by radar sensors, point cloud data captured by LiDAR sensors, data captured by inertial measurement units (IMU), data captured by inertial navigation units (INS), and data captured by RGBD-cameras, to name some examples. Other approaches for sampling sensor data are contemplated. For example, in some embodiments, the sampling module 304 can sample sensor data based on certain objects or certain types of objects being represented in the sensor data. For example, sensor data captured by a vehicle can be sampled when a dynamic object is represented in the sensor data. The dynamic object can be an object in motion such as a pedestrian, bicyclist, or vehicle, for example. In some embodiments, the sampling module 304 can sample sensor data based on geographic location. For example, sensor data captured by a vehicle can be sampled when the vehicle location corresponds to a particular geographic location (e.g., road, point of interest, city, etc.). In various embodiments, sensor data can be sampled based on a configuration of the machine learning model to be trained. For example, in some embodiments, the machine learning model may be trained based on sensor data captured by a pair of sensors of a vehicle at common points in time or time intervals. In such embodiments, the sampling module 304 can sample sensor data at various points in time (e.g., every 30 seconds, every minute, etc.). In some embodiments, the machine learning model may be trained based on sensor data captured by a pair of sensors of a vehicle over some duration of time. In such embodiments, the sampling module 304 can sample stacks of sensor data over various durations of time. For example, rather than only sampling sensor data once at a point in time t, the sampling module 304 can sample sensor data over a selected duration of time including sensor data captured at time t as well as sensor data captured at time t−1 and sensor data captured at time t−2. In some instances, training the machine learning model using stacked sensor data can improve a prediction accuracy of the machine learning model especially when dynamic objects are represented in the stacked sensor data. Many variations are possible.

The training module 306 can be configured to generate training examples from sampled sensor data. The sampled sensor data can be used to generate both positive and negative training examples for training the machine learning model. In various embodiments, each training example can be generated from sensor data sampled from a plurality of sensors of a vehicle. For example, a positive training example can be generated from sensor data sampled from a pair of calibrated optical cameras, a pair of calibrated LiDAR sensors, a pair of calibrated radar sensors, a calibrated optical camera and LiDAR sensor, a calibrated optical camera and radar sensor, and a calibrated LiDAR sensor and radar sensor, to name some examples. For example, a training example generated from image data captured by an optical camera and point cloud data captured by a LiDAR sensor can be structured as follows:

[R, G, B, P|Classification], where R corresponds to a red color channel of the image data, where G corresponds to a green color channel of the image data, where B corresponds to a blue color channel of the image data, where P corresponds to the point cloud data, and where Classification indicates whether the R, G, B, and P inputs were captured by calibrated or mis-calibrated sensors. In some embodiments, Classification is provided as a binary value. The structure of the training example shown above is provided as just one example. Naturally, the number of features included in such training examples can vary depending on the sensor data being used to train the machine learning model. For example, in some embodiments, training examples can include stacked sensor data corresponding to some duration of time. For example, a training example can include stacked sensor data which includes sensor data captured by a first sensor and a second sensor at time t, time t−1, and time t−2. The training module 306 can also generate negative training examples. For example, in some embodiments, the training module 306 can generate negative training examples from positive training examples. For example, the training module 306 can apply one or more transformations to sensor data included in positive training examples to generate negative training examples. The applied transformations can distort the positive training examples to synthetically produce mis-calibrated sensor data. One example transformation involves applying translation inaccuracies to sensor data. For example, translation or rotational inaccuracies applied to extrinsic calibration between the camera and LiDAR can offset the LiDAR point cloud with respect to the camera along the x-axis, y-axis, or z-axis. Many variations are possible. After generating training examples, the training module 306 can train the machine learning model to predict whether a pair of sensors of a vehicle are calibrated or mis-calibrated. In general, the machine learning model may be trained using generally known approaches for training a machine learning model. In some embodiments, the machine learning model is implemented as a neural network. However, depending on the implementation, other types of machine learning models may be trained.

The prediction module 308 can be configured to apply the trained machine learning model to predict in real-time (or near real-time) whether a pair of sensors of a vehicle are calibrated or mis-calibrated. For example, a first sensor and a second sensor of a vehicle can capture sensor data while the vehicle is navigating a geographic region. The sensor data captured by the first sensor and the second sensor can be provided as inputs to the trained machine learning model. The machine learning model can evaluate the inputted sensor data and can output information indicating whether the first sensor and the second sensor are calibrated or mis-calibrated. In some embodiments, the prediction module 308 can apply a regression analysis to the inputted sensor data to determine an amount of mis-calibration between the first sensor and the second sensor.

Figure 4A:
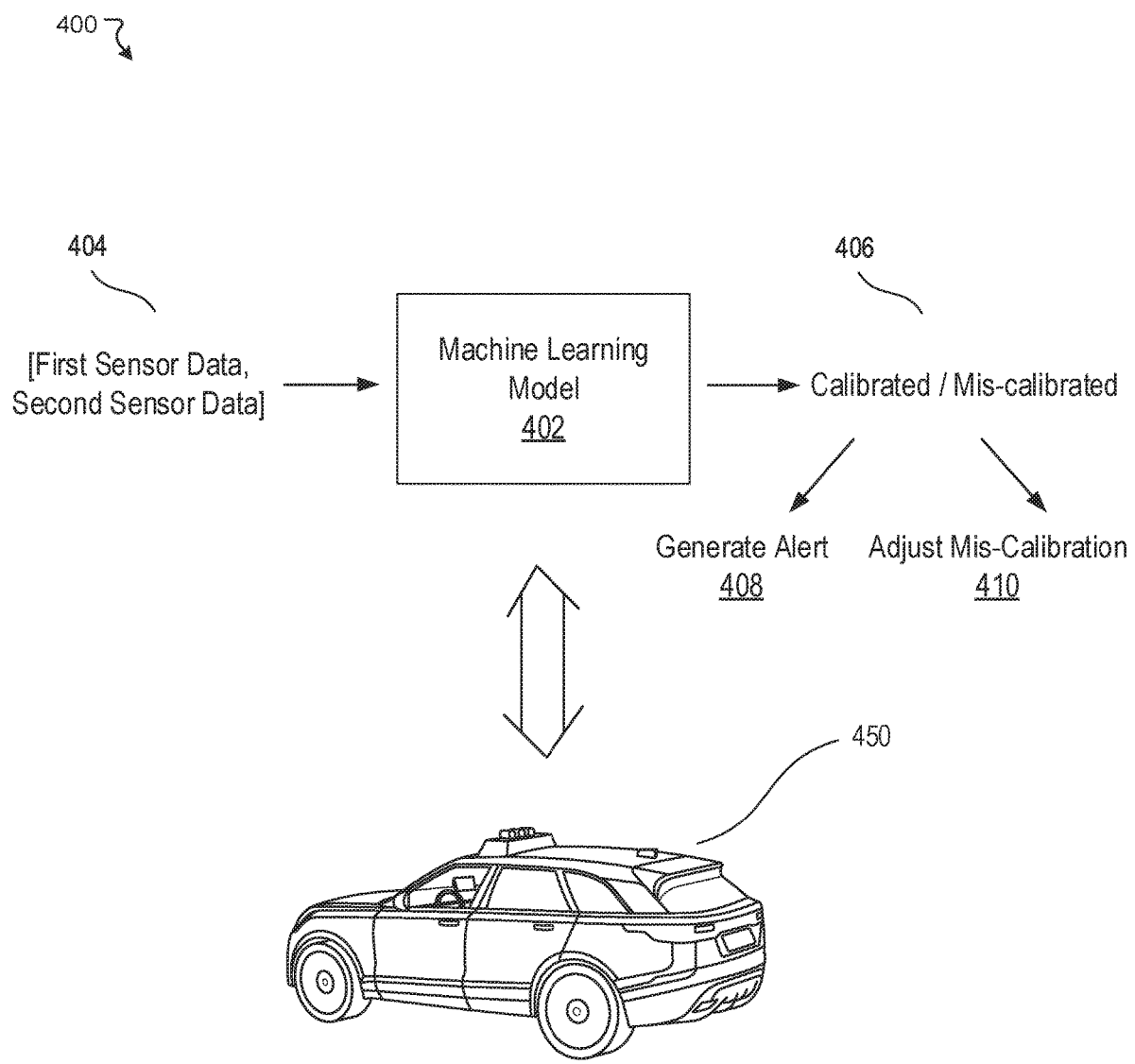
FIGS. 4A-4B illustrate example diagrams, according to an embodiment of the present technology.

FIG. 4A illustrates an example diagram 400 of a machine learning model 402 based on functionality of the sensor calibration module 202, according to an embodiment of the present technology. The machine learning model 402 can be trained as described above. In this example, the machine learning model 402 can be implemented by a vehicle 450 for purposes of determining whether sensors of the vehicle 450 are calibrated or mis-calibrated. The vehicle 450 can be, for example, the vehicle 640 as shown in FIG. 6. For example, in FIG. 4A, the sensor data 404 captured by a first sensor and a second sensor of the vehicle 450 can be provided as input to the machine learning model 402. The machine learning model 402 can evaluate the inputted sensor data 404 to output a prediction 406 indicating whether the first sensor and the second sensor are calibrated or mis-calibrated. In various embodiments, the machine learning model 402 can be applied to output such predictions for sensors of the vehicle 450 in real-time (or near real-time) in the form of an alert 408 to the vehicle 450 as the vehicle 450 navigates geographic regions. In some embodiments, the machine learning model 402 can determine an amount of mis-calibration associated with sensors of the vehicle 450 and cause corrective adjustment of the sensors based on the amount of mis-calibration 410.

Figure 4B:
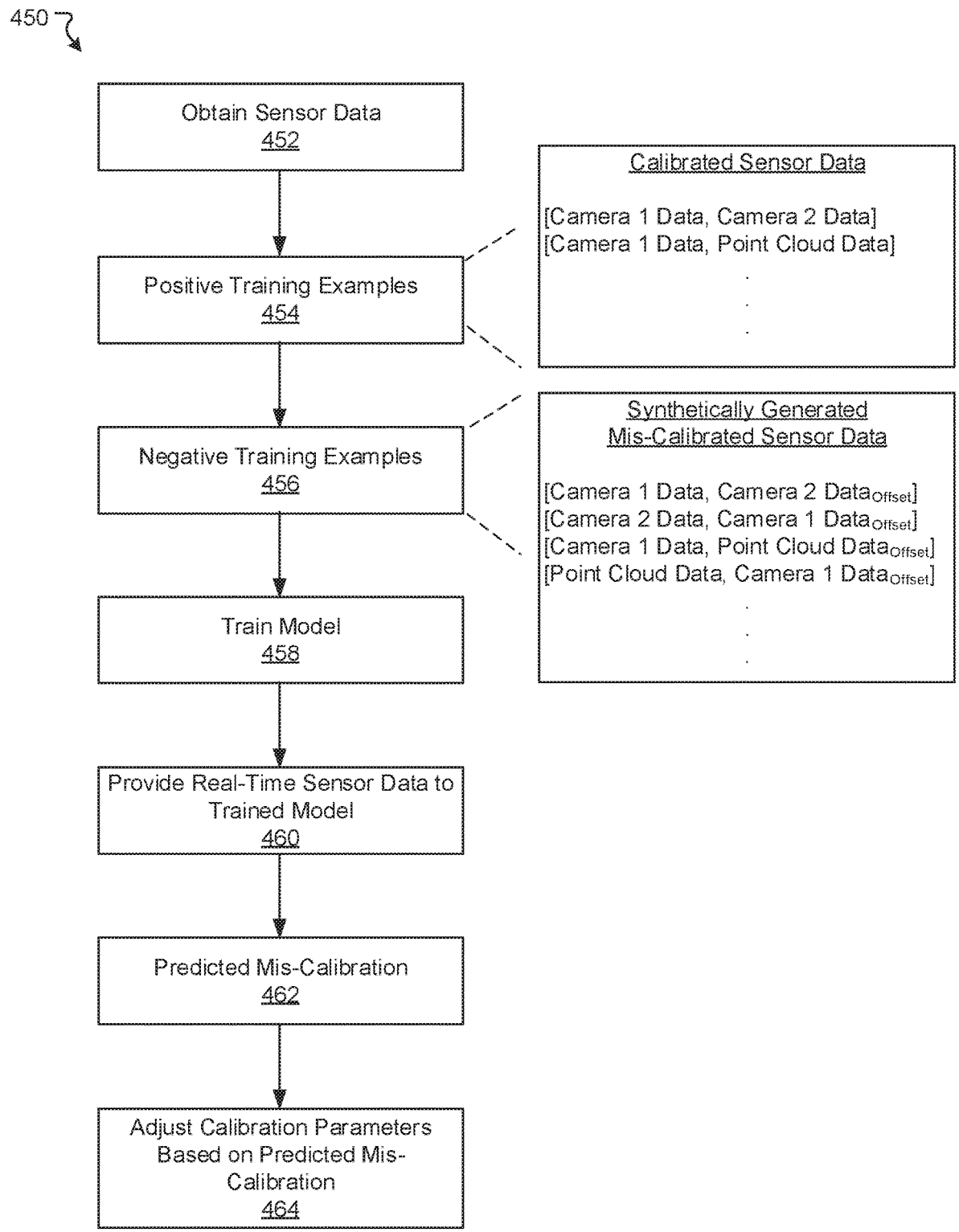

FIG. 4B illustrates an example diagram 450 of a process for training the machine learning model 402 based on functionality of the sensor calibration module 202, according to an embodiment of the present technology. In this example, sensor data collected by sensors of vehicles can be obtained at block 452. The obtained sensor data can be used to generate positive training examples 454 that each include calibrated sensor data captured by a pair of calibrated sensors. The positive training examples can be used to synthetically generate negative training examples 456 of mis-calibrated sensor data. For example, translation or rotational inaccuracies can be applied to the positive training examples 454 to synthetically generate the negative training examples 456. At block 458, a machine learning model can be trained to predict whether a pair of sensors are calibrated or mis-calibrated based on the positive and negative training examples. Once trained, sensor data captured from a pair of sensors of a vehicle in real-time (or near real-time) can be provided to the trained machine learning model at block 460. At block 462, the machine learning model can output a prediction indicating whether the pair of sensors of the vehicle are calibrated or mis-calibrated. The machine learning model can also output an amount of offset (or error) between the mis-calibrated pair of sensors. In various embodiments, at block 464, the amount of offset (or error) outputted by the model can be used to automatically adjust calibration parameters corresponding to the pair of sensors. Many variations are possible.

Figure 5:
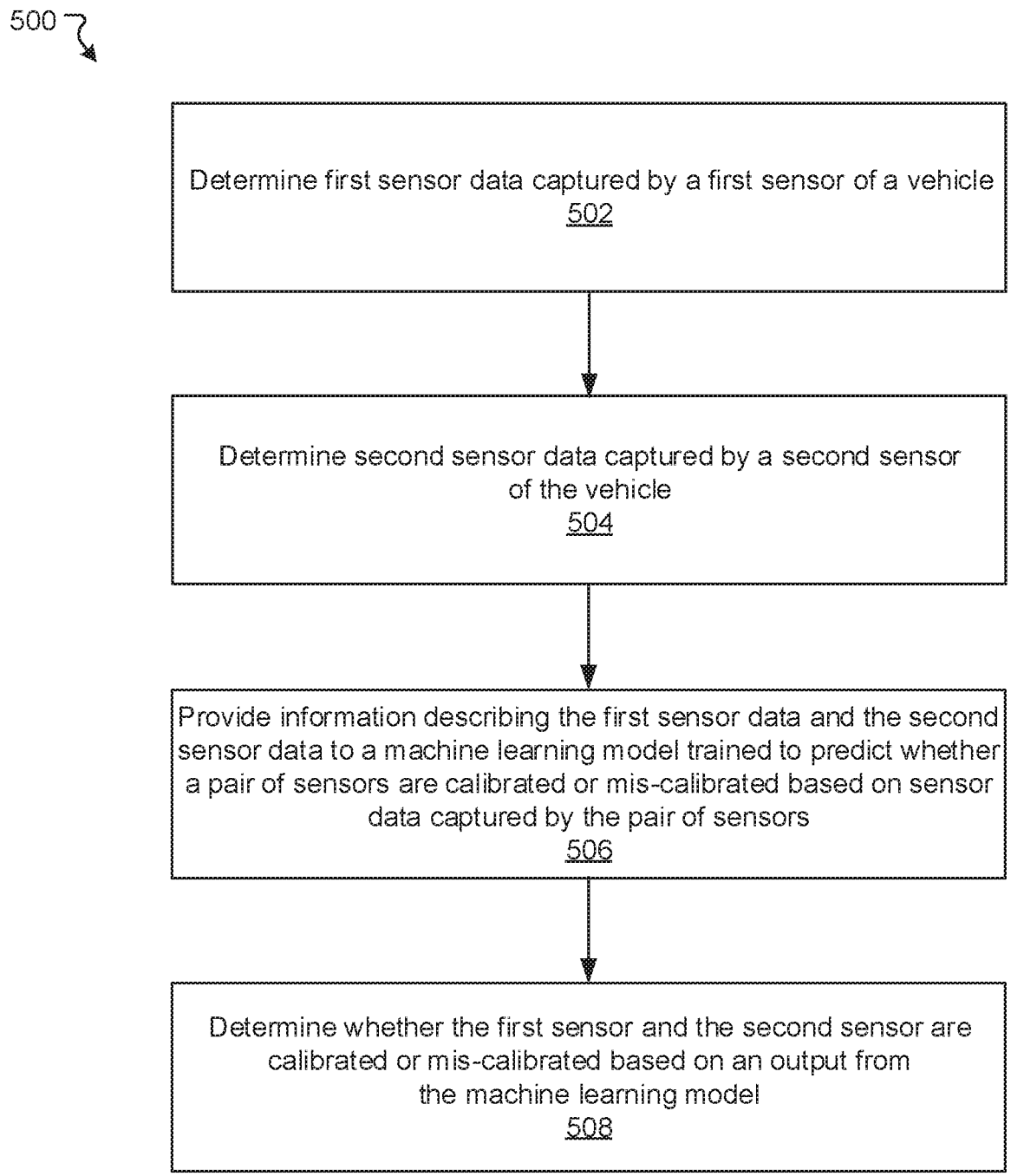
FIG. 5 illustrates an example method, according to an embodiment of the present technology.

FIG. 5 illustrates an example method 500, according to an embodiment of the present technology. At block 502, first sensor data captured by a first sensor of a vehicle can be determined. At block 504, second sensor data captured by a second sensor of the vehicle can be determined. At block 506, information describing the first sensor data and the second sensor data can be provided to a machine learning model trained to predict whether a pair of sensors are calibrated or mis-calibrated based on sensor data captured by the pair of sensors. At block 508, a determination is made whether the first sensor and the second sensor are calibrated or mis-calibrated based on an output from the machine learning model. Many variations to the example method are possible. It should be appreciated that there can be additional, fewer, or alternative steps performed in similar or alternative orders, or in parallel, within the scope of the various embodiments discussed herein unless otherwise stated.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules of the sensor calibration module 202 may be implemented by one or more computing systems of the transportation management system 660. In some embodiments, some or all modules of the sensor calibration module 202 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class.

For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
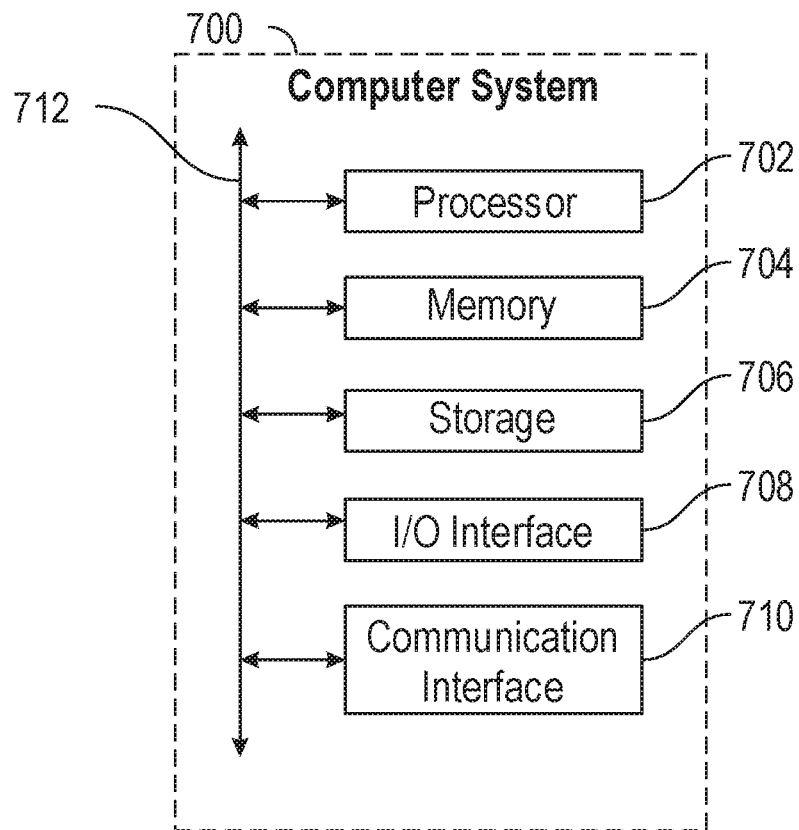
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
   determining, by a computing system, first sensor data captured by a first sensor of a vehicle;
   determining, by the computing system, second sensor data captured by a second sensor of the vehicle;
   providing, by the computing system, information describing the first sensor data and the second sensor data to a machine learning model,
   wherein the machine learning model is trained based on at least first training data that is associated with a first category of positive training examples and second training data that is associated with a second category of negative training examples, and the second training data corresponds to a transformation of the first training data based on one or more offsets applied to the first training data, and wherein the second training data corresponds to the one or more off sets producing inaccuracies in the first training data;
   determining, by the computing system, whether the first sensor and the second sensor are calibrated or miscalibrated based on an output from the machine learning model that includes applying a regression analysis to the first sensor data and the second sensor data; and
   automatically calibrating the first sensor and the second sensor in real-time according to the output.

2. The computer-implemented method of claim 1, wherein the regression analysis outputs an amount of miscalibration between the first sensor and the second sensor, and wherein the first sensor and the second sensor each correspond to an optical camera, a Light Detection And Ranging (LiDAR) sensor, a radar sensor, an infrared camera, an inertial navigation system (INS), or an ultrasound sensor.

3. The computer-implemented method of claim 1, wherein the first sensor data captured by the first sensor and the second sensor data captured by the second sensor are synchronized based on time.

4. The computer-implemented method of claim 1, wherein the first sensor is a same type of sensor as the second sensor.

5. The computer-implemented method of claim 1, wherein the first sensor is a different type of sensor than the second sensor.

6. The computer-implemented method of claim 1, wherein the first training data represents sensor data captured by a pair of calibrated sensors.

7. The computer-implemented method of claim 1, wherein the second training data is inaccurate relative to the first training data.

8. The computer-implemented method of claim 1, further comprising:

determining, by the computing system, that the first sensor and the second sensor are mis-calibrated based on the output from the machine learning model; and determining, by the computing system, an amount of mis-calibration between the first sensor and the second sensor.

9. The computer-implemented method of claim 1, further comprising:

determining, by the computing system, that the first sensor and the second sensor are mis-calibrated based on the output from the machine learning model; and generating, by the computing system, one or more alerts in response to the determination that the first sensor and the second sensor are mis-calibrated.

10. The computer-implemented method of claim 1, further comprising:

determining, by the computing system, that the first sensor and the second sensor are mis-calibrated based on the output from the machine learning model; and applying, by the computing system, one or more operations to correct the mis-calibration based at least in part on an amount of mis-calibration offset outputted by the machine learning model.

11. A system comprising: at least one processor; and a memory storing instructions that, when executed by the at least one processor, cause the system to perform:

determining first sensor data captured by a first sensor of a vehicle; determining second sensor data captured by a second sensor of the vehicle;

providing information describing the first sensor data and the second sensor data to a machine learning model to predict whether the first sensor and the second sensor are calibrated or mis-calibrated based on at least the first sensor data and the second sensor data, wherein the machine learning model is trained based on at least first training data that is associated with a first category of positive training examples and second training data that is associated with a second category of negative training examples, and the second training data corresponds to a transformation of the first training data based on one or more offsets applied to the first training data, wherein the second training data corresponds to the one or more offsets producing inaccuracies in the first training data;

determining whether the first sensor and the second sensor are calibrated or mis-calibrated based on an output from the machine learning model that includes applying a regression analysis to the first sensor data and the second sensor data; and automatically calibrating the first sensor and the second sensor in real-time according to the output.

12. The system of claim 11, wherein the regression analysis outputs an amount of mis-calibration between the first sensor and the second sensor, and wherein the first sensor and the second sensor each correspond to an optical camera, a Light Detection And Ranging (LiDAR) sensor, a radar sensor, an infrared camera, an inertial navigation system (INS), or an ultrasound sensor.

13. The system of claim 11, wherein the first sensor data captured by the first sensor and the second sensor data captured by the second sensor are synchronized based on time.

14. The system of claim 11, wherein the first sensor is a same type of sensor as the second sensor or the first sensor is a different type of sensor than the second sensor.

15. The system of claim 11, wherein the first training data represents sensor data captured by a pair of calibrated sensors, and the sensor data is ground truth data.

16. A non-transitory computer-readable storage medium including instructions that, when executed by at least one processor of a computing system, cause the computing system to perform:

determining first sensor data captured by a first sensor of a vehicle; determining second sensor data captured by a second sensor of the vehicle;

providing information describing the first sensor data and the second sensor data to a machine learning model to predict whether the first sensor and the second sensor are calibrated or mis-calibrated based on at least the first sensor data and the second sensor data, wherein the machine learning model is trained based on at least first training data that is associated with a first category of positive training examples and second training data that is associated with a second category of negative training examples, and the second training data corresponds to a transformation of the first training data based on one or more offsets applied to the first training data, wherein the second training data corresponds to the one or more off sets producing inaccuracies in the first training data; and determining whether the first sensor and the second sensor are calibrated or mis-calibrated based on an output from the machine learning model that includes applying a regression analysis to the first sensor data and the second sensor data; and automatically calibrating the first sensor and the second sensor in real-time according to the output.

17. The non-transitory computer-readable storage medium of claim 16, wherein the regression analysis outputs an amount of mis-calibration between the first sensor and the second sensor, and wherein the first sensor and the second sensor each correspond to an optical camera, a Light Detection And Ranging (LiDAR) sensor, a radar sensor, an infrared camera, an inertial navigation system (INS), or an ultrasound sensor.

18. The non-transitory computer-readable storage medium of claim 16, wherein the first sensor data captured by the first sensor and the second sensor data captured by the second sensor are synchronized based on time.

19. The non-transitory computer-readable storage medium of claim 16, wherein the first sensor is a same type of sensor as the second sensor or the first sensor is a different type of sensor than the second sensor.

20. The non-transitory computer-readable storage medium of claim 16, wherein the first training data represents sensor data captured by a pair of calibrated sensors, and the sensor data is ground truth data.

* * * * *